(12) United States Patent
Goh et al.

(10) Patent No.: US 11,070,150 B2
(45) Date of Patent: Jul. 20, 2021

(54) NOISE FILTERING METHOD FOR MOTOR, RECORDING MEDIUM THEREOF AND MOTOR CONTROL CIRCUIT

(71) Applicants: Lite-On Singapore Pte Ltd, Singapore (SG); Lite-On Technology Corporation, Taipei (TW)

(72) Inventors: Kok Liang Goh, Singapore (SG); Jian Song, Singapore (SG); Lukman Arif Kurniawan, Singapore (SG); Biswas Partha, Singapore (SG); Ying Lin, Singapore (SG); Lee Kia Ching, Singapore (SG); Cheng-Wen Hsieh, Taipei (TW)

(73) Assignees: Lite-On Singapore Pte Ltd, Singapore (SG); Lite-On Technology Corporation, Taipei (TW)

( * ) Notice: Subject to any disclaimer, the term of this patent is extended or adjusted under 35 U.S.C. 154(b) by 0 days.

(21) Appl. No.: 16/691,483

(22) Filed: Nov. 21, 2019

(65) Prior Publication Data
US 2020/0204092 A1  Jun. 25, 2020

(30) Foreign Application Priority Data

Dec. 25, 2018 (CN) .......................... 201811588145.2
Aug. 1, 2019 (CN) .......................... 201921235744.6

(51) Int. Cl.
*H02P 6/00* (2016.01)

(52) U.S. Cl.
CPC .................................... *H02P 6/007* (2013.01)

(58) Field of Classification Search
CPC ....................................................... H02P 6/007
USPC .................. 318/400.33, 400.32, 400.01, 700
See application file for complete search history.

(56) References Cited

U.S. PATENT DOCUMENTS

| 8,643,319 B2* | 2/2014 | Celik | ........................ H02P 6/28 318/400.14 |
| 8,773,052 B2* | 7/2014 | Clothier | .................... H02P 6/28 318/400.14 |
| 9,882,515 B2* | 1/2018 | Dernebo | ............... F04D 27/004 |

* cited by examiner

Primary Examiner — David Luo
(74) Attorney, Agent, or Firm — JCIPRNET

(57) ABSTRACT

The invention provides a noise filtering method for a motor. The motor rotates according to an operating voltage. The noise filtering method includes: setting an inspection period and a minimum threshold. The noise filtering method further includes: generating a pulse signal according to the operating voltage, determining whether a time corresponding to each sub-pulse signal in the pulse signal meets the inspection period, and determining whether a pulse width corresponding to each sub-pulse signal is equal to or greater than the minimum threshold. A recording medium storing a program code corresponding to the method, and a motor control circuit for executing the program code are also provided.

15 Claims, 7 Drawing Sheets

NOISE FILTERING METHOD FOR MOTOR, RECORDING MEDIUM THEREOF AND MOTOR CONTROL CIRCUIT

CROSS-REFERENCE TO RELATED APPLICATION

This application claims the priority benefits of China application serial no. 201811588145.2, filed on Dec. 25, 2018, and China application serial no. 201921235744.6, filed on Aug. 1, 2019. The entirety of each of the above-mentioned patent applications is hereby incorporated by reference herein and made a part of specification.

BACKGROUND OF THE INVENTION

1. Field of the Invention

The invention relates to motor driving technologies, and in particular, to a noise filtering method for a motor, a recording medium thereof, and a motor control circuit.

2. Description of Related Art

A motor is a main source for an electronic apparatus to provide mechanical power, and the motor can rotate according to an analog signal. In order to monitor a rotation state of the motor, the analog signal may be converted to a digital signal and processed by a detector. Since the analog signal includes noise, during conversion, the noise is also converted and presented as partial pulse signals in the digital signal.

In an ideal operating state, a complete rotation of the motor may correspond to a fixed-time pulse signal. Therefore, those skilled in the art may obtain an operating distance of a motor-driven mechanism based on a number of pulse signals. If the converted digital signal already includes a pulse signal corresponding to noise, an error occurs during conversion performed by a user.

Therefore, effectively filtering out the pulse signal corresponding to noise becomes one of the important issues in the art.

SUMMARY OF THE INVENTION

The invention provides a noise filtering method for a pulse signal corresponding to a motor, a recording medium storing a program code corresponding to the method, and a motor control circuit for executing the program code. The invention may be used to effectively filter out noise of a pulse signal during operation, so that a precise rotation state of the motor is estimated, and a displacement amount of a mechanism driven by the motor is correctly determined.

In an embodiment, the invention provides a noise filtering method for a motor. The motor rotates according to an operating voltage. The noise filtering method includes the following steps. An inspection period and a minimum are set. A pulse signal is generated according to the operating voltage. Whether a time corresponding to each sub-pulse signal in the pulse signal meets the inspection period is determined. Whether a pulse width corresponding to the sub-pulse signal is equal to or greater than the minimum threshold is determined.

In an embodiment, in the noise filtering method, the inspection period and the minimum threshold are set according to a rotation period of the motor, and the rotation period corresponds to a maximum rotation speed of the motor.

In an embodiment, in the noise filtering method, the inspection period is set to be in a range of 60% to 80% of the rotation period of the motor.

In an embodiment, in the noise filtering method, the minimum threshold is set to be in a range of 5% to 10% of the rotation period of the motor.

In an embodiment, in the noise filtering method, the step of determining whether a time corresponding to each sub-pulse signal in the pulse signal meets the inspection period includes the following steps. A time interval between a rising edge time point corresponding to the sub-pulse signal and another rising edge time point corresponding to a previous valid sub-pulse signal is calculated. When the time interval is equal to or greater than the inspection period, the sub-pulse signal is determined to meet the inspection period.

In an embodiment, in the noise filtering method, the step of determining whether the pulse width corresponding to each sub-pulse signal is equal to or greater than the minimum threshold includes the following steps. When the sub-pulse signal meets the inspection period, whether the pulse width corresponding to the sub-pulse signal is equal to or greater than the minimum threshold is determined. When the pulse width corresponding to the sub-pulse signal is equal to or greater than the minimum threshold, the pulse width is determined to be a valid pulse width, and a pulse count is correspondingly accumulated. The pulse count corresponds to a rotation state of the motor.

In an embodiment, in the noise filtering method, the pulse signal includes a rising edge and a falling edge, the rising edge is determined by using an interrupt algorithm or a general-purpose input/output (GPIO) poll algorithm, and the falling edge is determined by using the interrupt algorithm or the GPIO poll algorithm.

In an embodiment, the invention further provides a recording medium recording at least one program code, where the program code is loaded by a motor control circuit to perform the foregoing noise filtering method.

In an embodiment, in the recording medium, the inspection period and the minimum threshold are set according to a rotation period of the motor, and the rotation period corresponds to a maximum rotation speed of the motor.

In an embodiment, in the recording medium, the inspection period is set to be in a range of 60% to 80% of the rotation period of the motor.

In an embodiment, in the recording medium, the minimum threshold is set to be in a range of 5% to 10% of the rotation period of the motor.

In an embodiment, in the recording medium, the step of determining whether the time corresponding to each sub-pulse signal in the pulse signal meets the inspection period includes the following steps. A time interval between a rising edge time point corresponding to the sub-pulse signal and another rising edge time point corresponding to a previous valid sub-pulse signal is calculated. When the time interval is equal to or greater than the inspection period, the sub-pulse signal is determined to meet the inspection period.

In an embodiment, in the recording medium, the step of determining whether the pulse width corresponding to each sub-pulse signal is equal to or greater than the minimum threshold includes the following steps. When the sub-pulse signal meets the inspection period, whether the pulse width corresponding to the sub-pulse signal is equal to or greater than the minimum threshold is determined. When the pulse width corresponding to the sub-pulse signal is equal to or greater than the minimum threshold, the pulse width is determined to be a valid pulse width, and a pulse count is correspondingly accumulated. The pulse count corresponds to a rotation state of the motor.

In an embodiment, in the recording medium, the pulse signal includes a rising edge and a falling edge, the rising edge is determined by using an interrupt algorithm or a general-purpose input/output (GPIO) poll algorithm, and the falling edge is determined by using the interrupt algorithm or the GPIO poll algorithm.

In an embodiment, the invention further provides a motor control circuit for a motor. The motor rotates according to an operating voltage, and the motor control circuit includes a controller circuit, a recording medium of the controller circuit is configured to store program code corresponding to a noise filtering method, and a processor of the controller circuit executes the program code to perform the foregoing noise filtering method.

In an embodiment, the motor control circuit includes a drive circuit, a detection module, and a signal processing circuit, the drive circuit is coupled to the motor and drives the motor to rotate, the detection module and the signal processing circuit sense the operating voltage and transmit a result to the controller circuit, and the controller circuit outputs a control command to the drive circuit.

In an embodiment, the motor control circuit further includes a circuit board, a detection module, a signal processing circuit and a drive circuit. The detection module is disposed on the circuit board and electrically coupling to at least one motor and detects an operating current of the at least motor. The signal processing circuit is disposed on the circuit board and electrically coupled to the detection module, and generates at least one detection signal according to the operating current of the at least motor. The controller circuit is disposed on the circuit board and electrically coupling to the signal processing circuit, and counts a number of ripples of the operating current according to the detection signal to obtain position information of at least one object after being moved by the at least one motor. The drive circuit is disposed on the circuit and electrically coupling to the at least one motor and the controller circuit, and supplies an operating current to the at least one motor according to at least one control signal from the controller circuit.

In an embodiment, the motor control circuit further includes at least one positioning detector. The at least one positioning detector is electrically coupling to the controller circuit, and detects whether the at least one object passes through the at least one detection position on a movement path and correspondingly generates a positioning signal, wherein the controller circuit obtains a reference position information corresponding to the at least one detection position according to the positioning signal.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

The invention relates to noise filtering technologies for a pulse signal of a motor, and may be used to effectively filter out a pulse signal corresponding to noise, to estimate a rotation state of the motor, thereby obtaining a displacement amount of a mechanism driven by the motor.

Some embodiments are illustrated below to describe the invention, but the invention is not limited to the illustrated embodiments.

Figure 1:
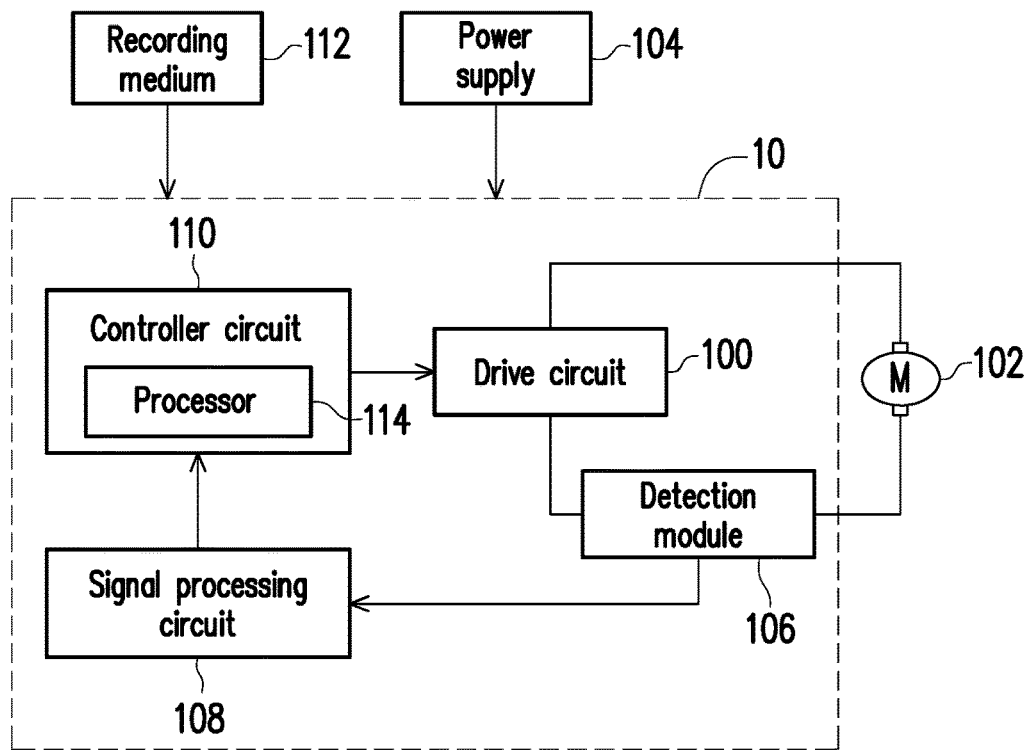
FIG. 1 is a schematic block diagram of a structure of a motor control circuit for a motor according to an embodiment of the invention.

FIG. 1 is a block diagram of a motor control circuit 10 that may be used on a motor 102 according to an embodiment of the invention. Referring to FIG. 1, the motor control circuit 10 is coupled to the motor 102, and includes a drive circuit 100, a detection module 106, a signal processing circuit 108, and a controller circuit 110. A power supply 104 is coupled to the motor control circuit 10 to provide an operating voltage (or current) required by the motor control circuit 10. The controller circuit 110 outputs a control command to the drive circuit 100. The motor 102 receives the operating voltage of the drive circuit 100 to rotate. The detection module 106 monitors the operating voltage of the motor 102, and transmits a sensing result to the signal processing circuit 108. Then the signal processing circuit 108 transmits a processed pulse signal to the controller circuit 110. The controller circuit 110 can filter out a pulse signal corresponding to noises to obtain a correct pulse count, thereby obtaining a correct rotation number of the motor 102.

Figure 2:
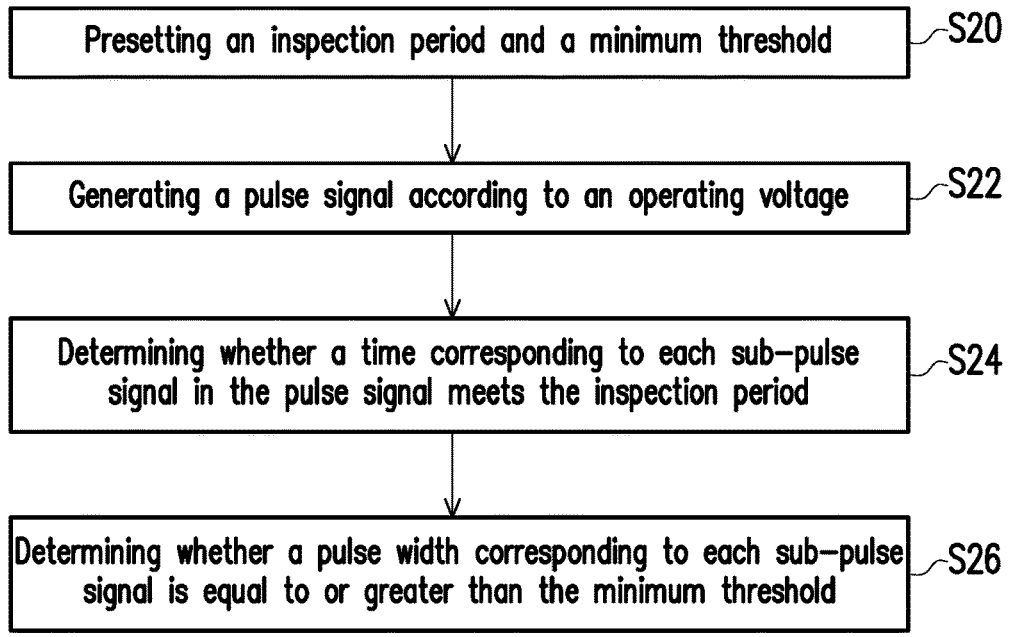
FIG. 2 is a schematic flow chart of a noise filtering method for a motor according to an embodiment of the invention.

Referring to both FIG. 1 to FIG. 2, FIG. 2 is a flow chart of a noise filtering method that may be used for a motor according to an embodiment of the invention. The controller circuit 110 in this embodiment includes a processor 114. The noise filtering method may be compiled into a program code and stored in the recording medium 112. The motor control circuit 10 can access the program code, and the processor 114 of the controller circuit 110 executes the program code in the recording medium 112. In another embodiment, the recording medium 112 may also be disposed inside the controller circuit 110. The recording medium 112 is configured to provide a program code, and may not only be disposed inside or outside the motor control circuit 10, but also be configured in other possible manners.

In step S20 of this embodiment, an inspection period and a minimum threshold are preset and stored in the recording medium 112. Preferably, the inspection period and the minimum threshold may be correspondingly set according to a rotation period of the motor 102, or may be correspondingly set by a user according to a use condition, which is not limited herein. In addition, in this embodiment, the rotation period corresponds to a maximum rotation speed of the motor. In different application scenarios, those skilled in the art may adjust values of the inspection period and the minimum threshold based on a lookup table to, which does not limit the scope of the invention.

Figure 3:
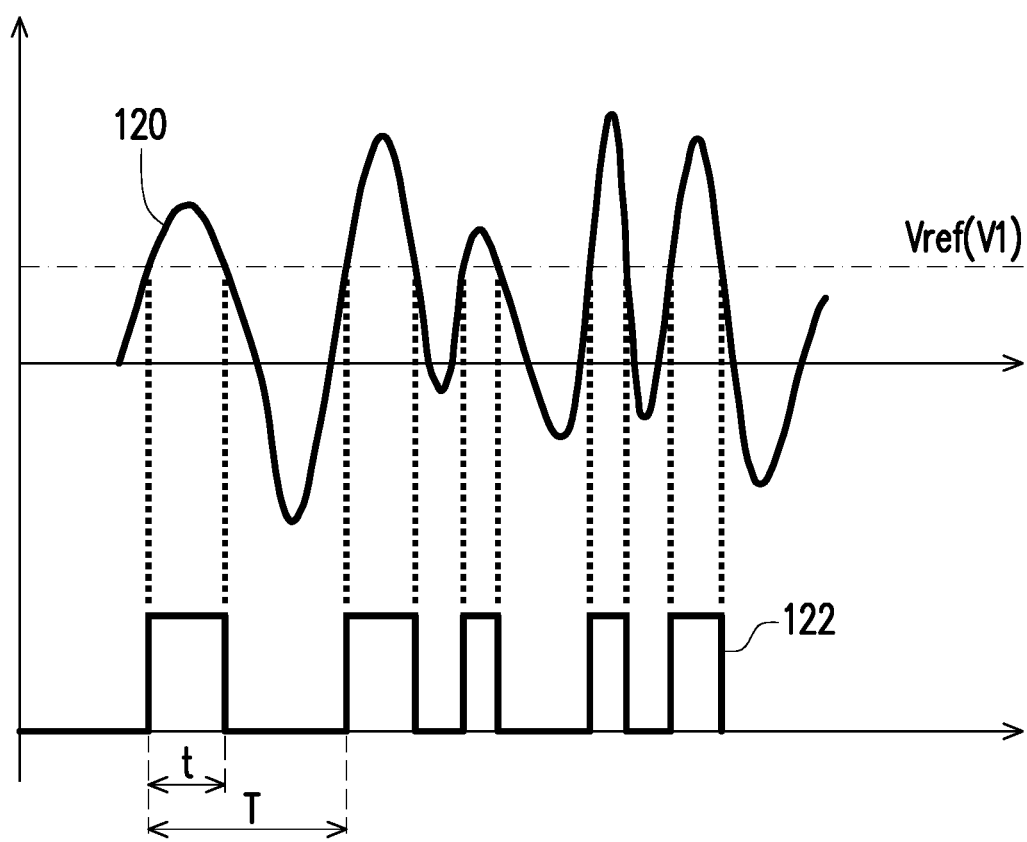
FIG. 3 is a schematic diagram of converting an operating voltage into a pulse signal according to an embodiment of the invention.
Figure 4:
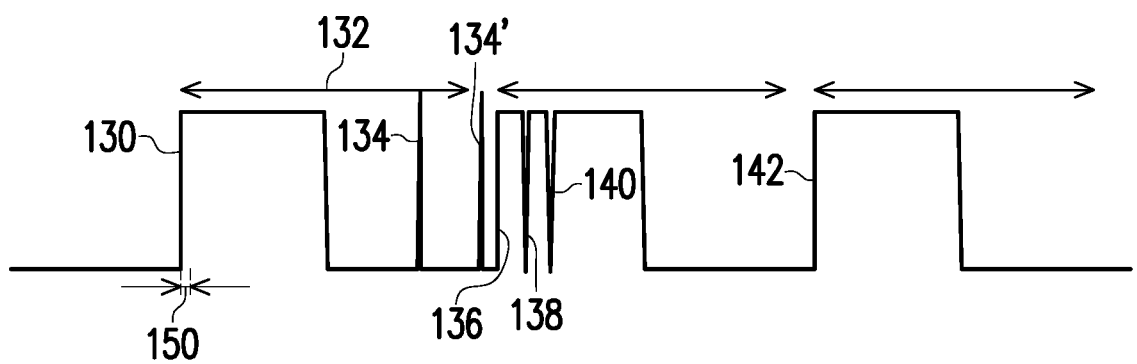
FIG. 4 is a schematic diagram of application of a noise filtering method for determining of a pulse signal according to an embodiment of the invention.

In step S22, the detection module 106 and the signal processing circuit 108 generate a pulse signal according to the operating voltage and output the pulse signal to the controller circuit 110. Referring to both FIG. 3 and FIG. 4, FIG. 3 is a schematic diagram of converting an operating voltage into a pulse signal according to an embodiment of the invention, and FIG. 4 is a schematic diagram of application of a noise filtering method for determining of a pulse signal according to an embodiment of the invention. The detection module 106 can correspondingly sense an analog signal 120 according to the operating voltage of the motor 102. This analog signal 120 includes a positive value (that is, a positive voltage) or a negative value (that is, a negative voltage) relative to a zero level. The analog signal 120 is converted into a pulsed signal 122 by the signal processing circuit 108. The signal processing circuit 108 includes a band pass filter, an amplifier, and a comparator. The comparator sets a reference voltage Vref. Accordingly, the signal processing circuit 108 can convert analog signal 120 into a digital pulse signal 122. The pulse signal 122 includes a plurality of serial sub-pulse signals. In this embodiment, the rotation period of the motor 102 corresponding to the maximum rotation speed is T, and the inspection period 132 may be set to be in a range of 60% to 80% of the rotation period T of the motor 102. An inspection period 132 shown in FIG. 4 is 80% of the rotation period T. The maximum threshold may be set to be in a range of 5% to 10% of the rotation period T of the motor 102. A maximum threshold 150 shown in FIG. 4 may be set to 5% of the rotation period T. In addition, due to different external interference, in the embodiment, there may be zero or at least one invalid noise pulse among a plurality of sub-pulse signals, such as a signal corresponding to a rising edge time point 134'. However, a number of invalid pulse widths in this embodiment is merely for description, and is not intended to limit the scope of the invention.

In this embodiment, since the inspection period 132 is the range of 60% to 80% of the rotation period T, there is a time gap between two adjacent inspection periods 132. Within the time interval, the motor control circuit 10 can perform other required operations, or stop detection, etc., but the invention is not limited thereto.

Preferably, in this embodiment, a rising edge time point or a falling edge time point of each sub-pulse signal may be correspondingly determined based on an interrupt algorithm or a general-purpose input/output (GPIO) poll algorithm, and are used as references subsequently. Certainly, according to different requirements, a program code corresponding to the interrupt algorithm or the GPIO poll algorithm is also stored in the recording medium 112, and is correspondingly executed by a processing unit of the controller circuit 110.

In step S24 of this embodiment, it is determined whether a time corresponding to each sub-pulse signal in the pulse signal meets the inspection period 132. Preferably, in this embodiment, a time interval between a rising edge time point corresponding to the sub-pulse signal and another rising edge time point corresponding to a previous valid sub-pulse signal is calculated, and when the time interval is equal to or greater than the inspection period 132, it is determined that the sub-pulse signal meets the inspection period 132. In short, in this embodiment, it may be determined whether a time interval corresponding to the two rising edge time points of the two consecutive sub-pulse signals is equal to or greater than the inspection period 132, and then it is determined whether the time interval meets the inspection period 132. Certainly, in other embodiments, the controller circuit 110 may also obtain two falling edge time points of two consecutive sub-pulse signals in the pulse signal as a determining basis, or use either the rising edge time point or the falling edge time point alternately according to different conditions, which is not used to limit the scope of the invention.

In another embodiment, the rising edge time point corresponding to the sub-pulse signal is further detected, to obtain a pulse width of the rising edge time point, thereby determining whether the pulse width is equal to or greater than the minimum threshold. When the pulse width corresponding to the sub-pulse signal is equal to or greater than the minimum threshold 150, the controller circuit 110 may correspondingly set the rising edge time point of the sub-pulse signal as an initial time point to be used as a reference point for subsequent determining of the sub-pulse signal.

Following step S24, when it is determined that the sub-pulse signal meets the inspection period, in step S26 of this embodiment, it is further determined whether the pulse width corresponding to the sub-pulse signal is equal to or greater than the minimum threshold 150. Further, when the pulse width corresponding to the sub-pulse signal is equal to or greater than the minimum threshold 150, it is determined that the pulse width is a valid pulse width, and the controller circuit 110 correspondingly accumulates a pulse count.

Operations in the steps S20-S26 of this embodiment are still understood based on FIG. 4, and the rising edge time point is used as a detection basis. First, the controller circuit 110 may set a rising edge time point 130 as the initial time point, and correspondingly determine that a pulse width corresponding to the rising edge time point 130 is greater than the minimum threshold. Accordingly, it may be determined that the rising edge time point 130 corresponds to a valid pulse width. In addition, the rising edge time point 130 is recorded as a subsequent reference basis, and the controller circuit 110 may accumulate the pulse count by one. Then a rising edge time point 134 appears. Since a time interval between the rising edge time point 134 and the rising edge time point 130 is less than the inspection period 132, it is determined that the rising edge time point 134 corresponds to an invalid pulse width, and therefore, the rising edge time point 134 is not used. Then a rising edge time point 136 appears. A time interval between the rising edge time point 136 and the rising edge time point 130 is greater than the inspection period 132, and it is determined that a pulse width corresponding to the rising edge time point 136 is greater than the minimum threshold 150. Accordingly, it may be determined that the rising edge time point 136 corresponds to a valid pulse width. In addition, the rising edge time point 136 is recorded as a subsequent reference basis, and the controller circuit 110 may accumulate the pulse count by another one. Next, a rising edge time point 138 or a rising edge time point 140 appears. Since a time interval between the rising edge time point 138 and the rising edge time point 136 and a time interval between the rising edge time point 140 and the rising edge time point 136 are both less than the inspection period 132, it is determined that the rising edge time points 138 and 140 correspond to an invalid pulse width, and therefore the rising edge time points 138 and 140 are not used. Accumulation of pulse counts continues until a rising edge time point 142 appears.

In another embodiment, it is assumed that a sub-pulse signal of a rising edge time point 134' appears beyond the inspection period 132 but before the rising edge time point 136. Accordingly, even if the rising edge time point 134' of the sub-pulse signal can meet the inspection period 132, the rising edge time point 134' is not used in this embodiment because a corresponding pulse width thereof is less than the minimum threshold 150 (that is, an invalid pulse width).

According to the processing mechanism of the foregoing processing circuit, in an embodiment, counting of rotation of the motor 102 may be an accumulation operation as a loop mechanism. The loop mechanism continuously detects rising edges and/or falling edges corresponding to a plurality of sub-pulse signals in the pulse signal. The accumulation operation of the loop mechanism is described in another embodiment below.

Figure 5:
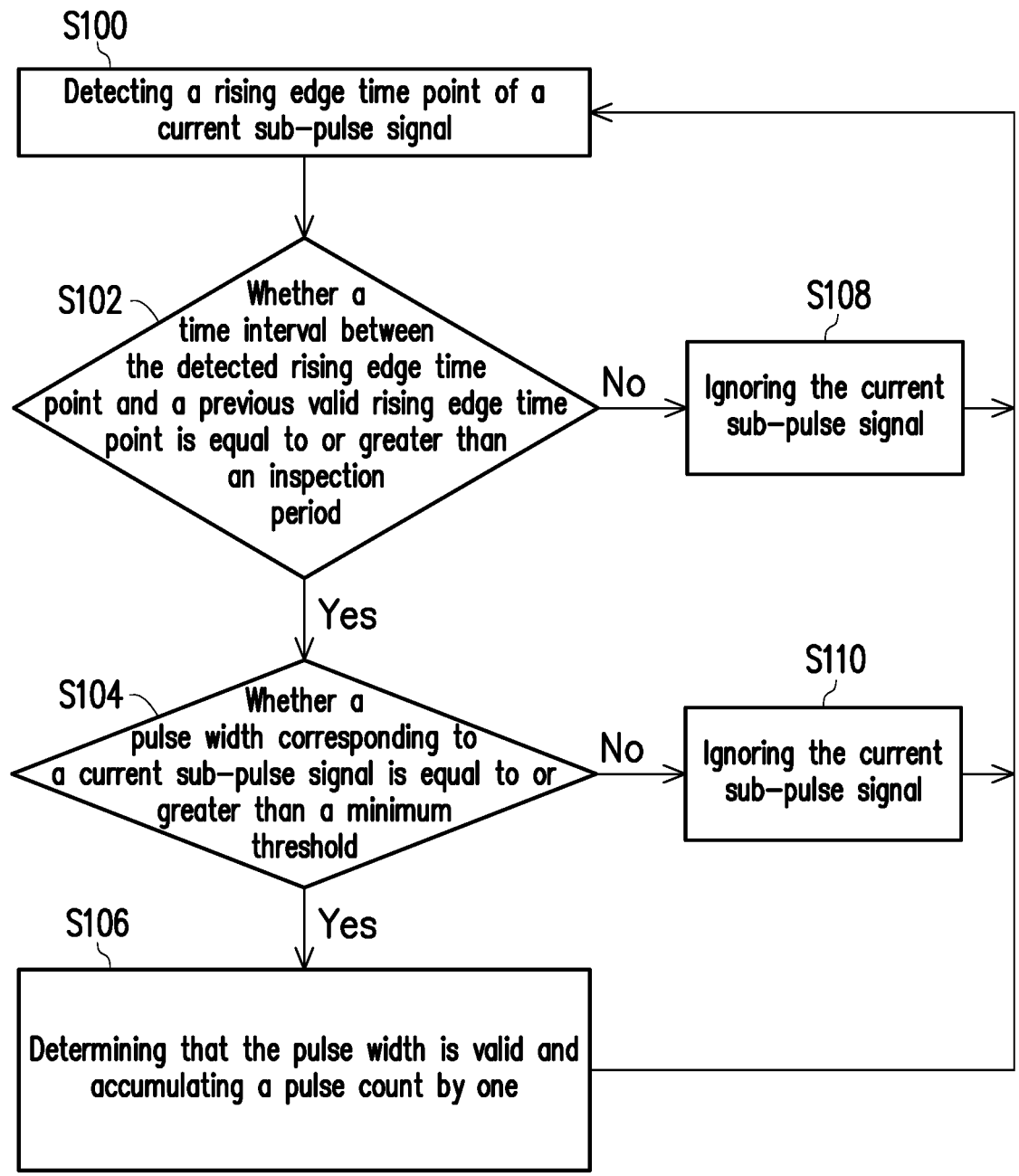
FIG. 5 is a schematic flow chart of accumulation of pulse counts during operation of a motor according to an embodiment of the invention.

FIG. 5 is a schematic flow chart of accumulation of pulse counts during operation of a motor according to an embodiment of the invention. Similarly, steps S100-S110 in FIG. 5 may be correspondingly compiled into another program code and stored in the recording medium 112 in FIG. 1, and the program code is executed by the processing unit of the controller circuit 110. Referring to FIG. 5, as the motor rotates, in step S100, a rising edge time point of a current sub-pulse signal is detected. Next, in step S102, it is determined whether a time interval between the rising edge time point corresponding to the current sub-pulse signal and a rising edge time point corresponding to a previous sub-pulse signal is equal to or greater than the inspection period. If the time interval is less than the inspection period in step S102, the process proceeds to step S108 of ignoring the current sub-pulse signal, and returns to step S100. A mechanism of step S102 is the same as that of step S22 in FIG. 2, and is not described herein. If the time interval is equal to or greater than the inspection period in step S102, the process proceeds to step S104 of determining whether the pulse width corresponding to the current sub-pulse signal is equal to or greater than the minimum threshold. A mechanism of step S104 is the same as that of step S24 in FIG. 2, and is not described herein. If the pulse width is less than the minimum threshold in step S104, the process proceeds to step S110 of ignoring the current sub-pulse signal, and returns to step S100. If the pulse width is equal to or greater than the minimum threshold step S104, the process proceeds to step S106 of determining that the pulse width is valid and accumulating the pulse count by one, and returns to step S100 again. Accordingly, in this embodiment, the accumulation operation in the foregoing steps is repeated to obtain a correct pulse count to calculate a rotation number of the motor 102, and thereby, a total displacement amount of the mechanism driven by the motor is estimated.

In short, in this embodiment of the invention, in addition to the used inspection period that may correspond to rotation of the motor, the minimum threshold is also used to effectively filter out the pulse signal corresponding to the noise. Based on the two specified parameters and the interrupt algorithm or the general-purpose input/output poll algorithm to dynamically detecting rising edge time points/falling edge time points of the pulse signal, the pulse count corresponding to rotation of the motor can be correctly calculated, and thereby, the displacement amount of the mechanism driven by the motor is accurately estimated.

Figure 6:
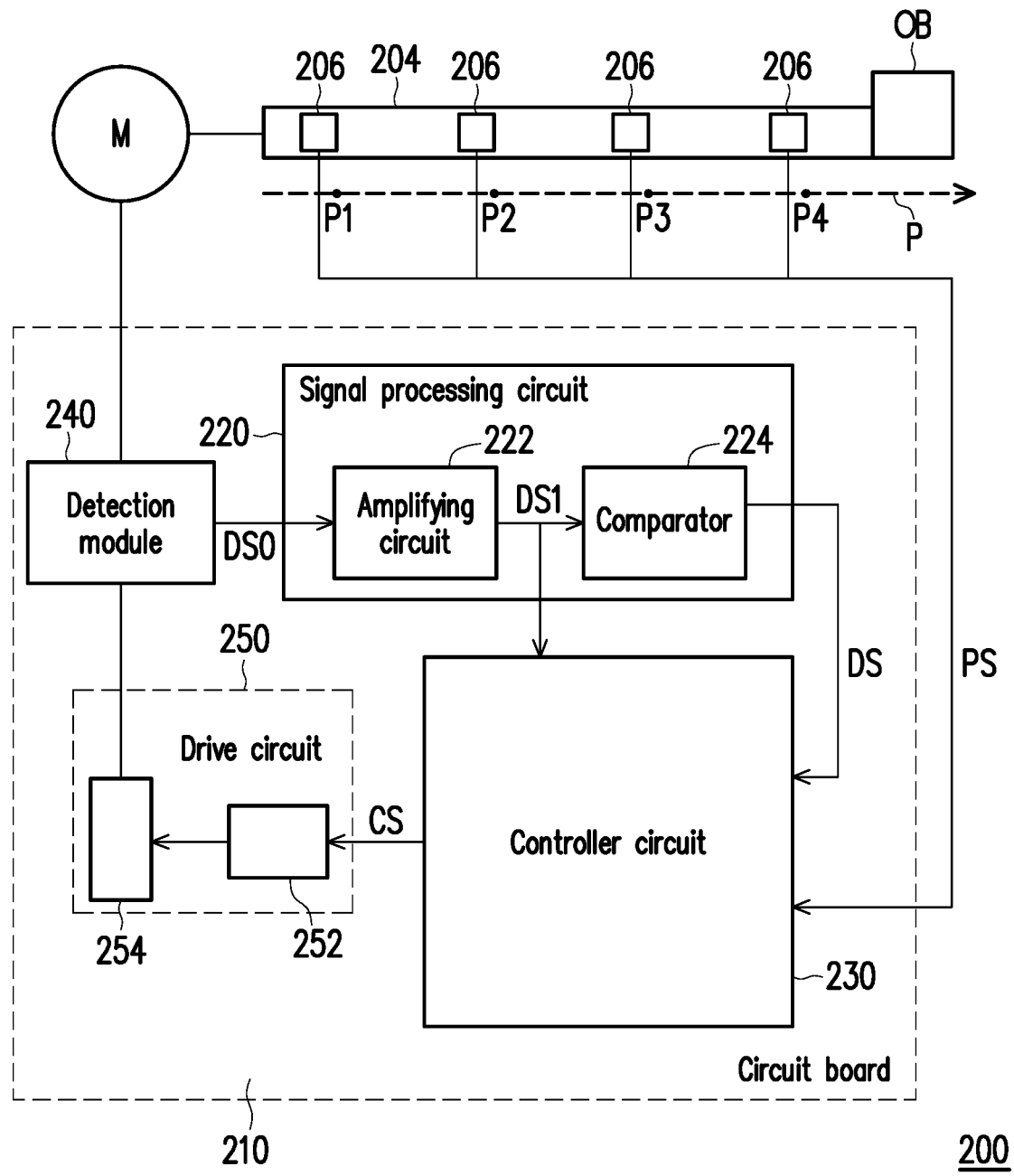
FIG. 6 is a schematic block diagram of a motor control apparatus according to an embodiment of the invention.

FIG. 6 is a schematic block diagram of a motor control apparatus according to an embodiment of the invention. Referring to FIG. 6, a motor control apparatus 200 is configured to control at least one motor (FIG. 6 shows one motor M as an example) to move an object OB along a movement path P. The motor M is, for example, a direct current motor, but the invention is not limited thereto. The motor control apparatus 200 is electrically connected to the motor M to control the motor M and monitor position information of the object OB after being moved by the motor M. The motor control apparatus 200 further includes a transmission apparatus 204. The transmission apparatus 204 is coupled to the motor M and the object OB, and includes, for example, a slide rail, a gear, a belt, a chain, a transmission shaft, etc. The invention is not limited thereto. The motor M drives the transmission apparatus 204 to move the object OB along the movement path P.

The motor control apparatus 200 may be widely applied to various products. For example, the motor control apparatus 200 may be mounted on a vehicle, and the object OB is a moving part of the vehicle, such as a sunroof, a sunshade device (such as a sunshade window), a power window, a roof cover, a power door, or a power tailgate, etc. The motor control apparatus 200 controls opening/closing of the sunroof of the automobile or the lifting/lowering of the window or the tailgate. In another embodiment, the motor control apparatus 200 may be mounted on a power seat or a power bed, and the object OB may be, for example, a seat cushion, a seat back, or a mattress, etc. In another embodiment, the motor control apparatus 200 may be mounted in a robot, and the object OB may be, for example, a robot arm, etc. Neither use of the motor control apparatus 200 nor a type of the object OB is limited in the invention.

The motor control apparatus 200 includes a circuit board 210, a signal processing circuit 220, a controller circuit 230, a detection module 240, and a drive circuit 250. The detection module 240, the drive circuit 250, the signal processing circuit 220, and the controller circuit 230 are all disposed on the circuit board 210. The detection module 240 is electrically coupling to the motor M for detecting an operating current of the motor M. The signal processing circuit 220 is electrically coupling to the detection module 240 for generating a detection signal DS according to the operating current of the motor M. The controller circuit 230 is implemented, for example, in a form of a chip module, and is electrically coupling to the signal processing circuit 220 for controlling the motor M to move the object OB and counting a number of ripples of the operating current of the motor M according to the detection signal DS, so as to obtain position information of the object OB after being moved by the motor M. The drive circuit 250 is electrically connected to the motor M and the controller circuit 230 for supplying an operating current to the motor M according to a control signal CS from the controller circuit 230.

In particular, the detection module 240 is, for example, a shunt resistor/current sensor. That the detection module 240 being a shunt resistor is used as an example herein. The detection module 240 detects the operating current of the motor M to output an original detection signal DS0. The signal processing circuit 220 receives the original detection signal DS0 to output a processed original detection signal DS0 (represented by a detection signal DS) to the controller circuit 230. The drive circuit 250 includes, for example, a driver 252 and a relay 254. The driver 252 receives the control signal CS from the controller circuit 230 to control rotation of the motor M through the relay 254. In this embodiment, the original detection signal DS0 is an analog signal, but the detection signal DS output from the signal processing circuit 220 may be a digital signal. The controller circuit 230 may obtain the position information of the object OB according to the detection signal DS, and adaptively control operation of the motor M using the drive circuit 250. The position information is, for example, a ripple number or a moving distance of the object OB calculated based on the ripple number.

A signal processing circuit 220 in FIG. 6 includes an amplifying circuit 222 and a comparator 224. The amplifying circuit 222 includes, for example, an amplifier, a differential amplifier, or a combination of the elements. The amplifying circuit 222 amplifies only an amplitude of the original detection signal DS0 and outputs an amplified original detection signal DS0 (represented by an original detection signal DS1). Next, the comparator 224 receives the original detection signal DS1 to correspondingly output a detection signal DS. The comparator 224 compares the original detection signal DS1 to a reference voltage threshold to output a logic level "0" or "1".

Figure 7:
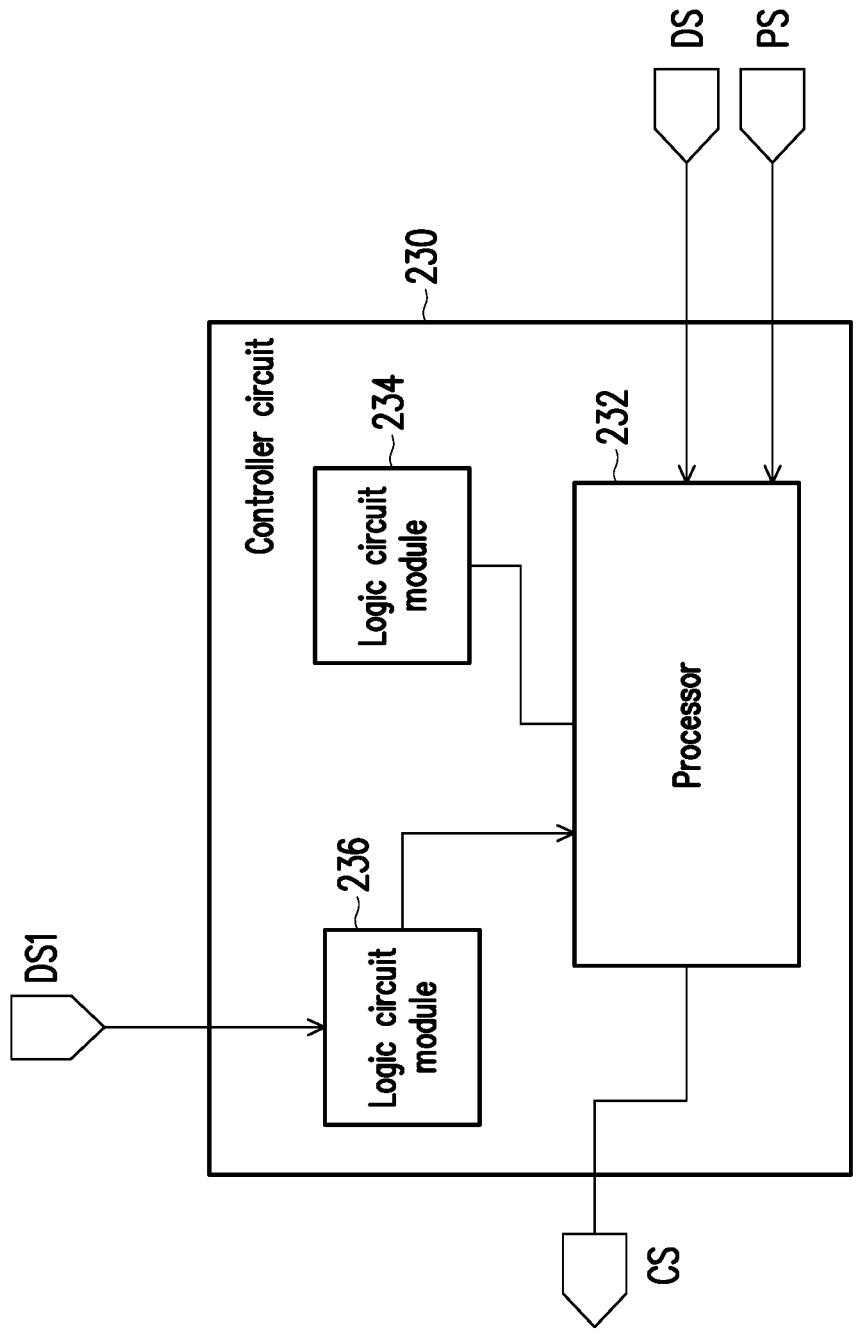
FIG. 7 is a block diagram of a motor control circuit according to an embodiment of the invention.

FIG. 7 is a block diagram of a controller circuit according to an embodiment of the invention. Referring to FIG. 7, the controller circuit 230 is a chip module including at least a processor 232 and logic circuit modules 234 and 236. The processor 232 is, for example, a micro controller unit (MCU), a central processing unit (CPU), any programmable microprocessor or a digital signal processor (DSP), a programmable controller, an application specific integrated circuit (ASIC), a programmable logic device (PLD), or other apparatuses with a computing capability. The logical circuit module 234 may be any type of fixed or removable random access memory (RAM), a read-only memory (ROM), a flash memory, or similar element, or a combination of the elements. The logical circuit module 234 stores data required for running of the motor control apparatus 200, for example, a lookup table or a program code. The processor 232 is electrically coupled to the logical circuit module 234 to load the program code and execute the program code. The logical circuit module 236 is configured to perform an analog-to-digital conversion (Analog to Digital Converter, ADC) operation. For example, referring to FIG. 3, the logical circuit module 236 converts the original detection signal DS1 (shown by a curve 120) from the amplifying circuit 222 into a digital signal (shown by a curve 122).

In this embodiment, the processor 232 may execute at least one program code to implement a counting function and/or a filtering function. For example, prior to counting a ripple number, the processor 232 performs a program code of the filtering function to pre-filter noise in the detection signal DS, so as to improve accuracy of the ripple number. In FIG. 3, after the curve 122 representing the detection signal DS detects two adjacent rising edges (for example, the time interval T), the processor 232 further executes a program code of the counting function to accumulate the ripple number by one.

In another embodiment, the signal processing circuit 220 may not need the comparator 224, and alternatively, the processor 232 executes the program code to calculate the number of ripples of the operating current of motor M. The processor 232 may directly receive the original detection signal DS1 in a form of an analog signal to obtain a plurality of sample values of the original detection signal DS1, so as to calculate the ripple number. An implementation of calculating the ripple number is not limited in the invention.

In this embodiment, the motor control apparatus 200 further includes at least one positioning detector 206 for detecting whether the object OB passes through at least one detection position (for example, detection positions P1-P4) on the movement path P and correspondingly generating a positioning signal PS. The positioning detector 206 is one or a combination of at least two of the following: for example, a photoelectric sensor (a light source is, for example, visible light, infrared light, or other non-visible light, and an image sensor is carried, or implementations such as a laser or an optical fiber may be used), a pressure sensor, an infrared sensor, a magnetic sensor, a resistive sensor, which is not intended to limit the scope of the invention. The positioning detector 206 may be disposed in the transmission apparatus 204 and correspondingly disposed on at least one of the detection positions P1-P4 along the movement path P. The detection positions P1-P4 are fixed positions on the movement path P, and a position of the transmission apparatus 204 may, for example, match a function or a size of the object OB to be correspondingly disposed on a window frame, a door frame, a window body, or a door body of a vehicle, which is not intended to limit the scope of the invention. Four positioning detectors 206 are used as an example in FIG. 6, which correspond to four different detection positions P1-P4 on the moving track P respectively. However, the detection position and the number of corresponding positioning detectors are not limited in the invention.

The processor 232 receives the positioning signal PS. When the object OB passes through one of the detection positions P1-P4, the processor 232 may determine a current position of the object OB in real time according to the positioning signal PS.

The logical circuit module 234 may pre-store reference position information of the detection positions P1-P4. The reference position information is, for example, coordinates of the detection positions P1-P4 on the movement track P and/or a corresponding reference ripple number. The processor 232 may also compare position information on the detection positions P1-P4 to the reference position information to correct the position information. When the processor 232 determines that current position information does not match the reference position information, the processor 232 updates the position information to the reference location information. In short, the controller circuit 230 may determine whether the position information corresponding to the detection positions P1-P4 match the reference position information, so as to update the current position information.

An implementation in which the motor control apparatus 200 implements position compensation using the positioning detector 206 is described in further detail below.

Figure 8:
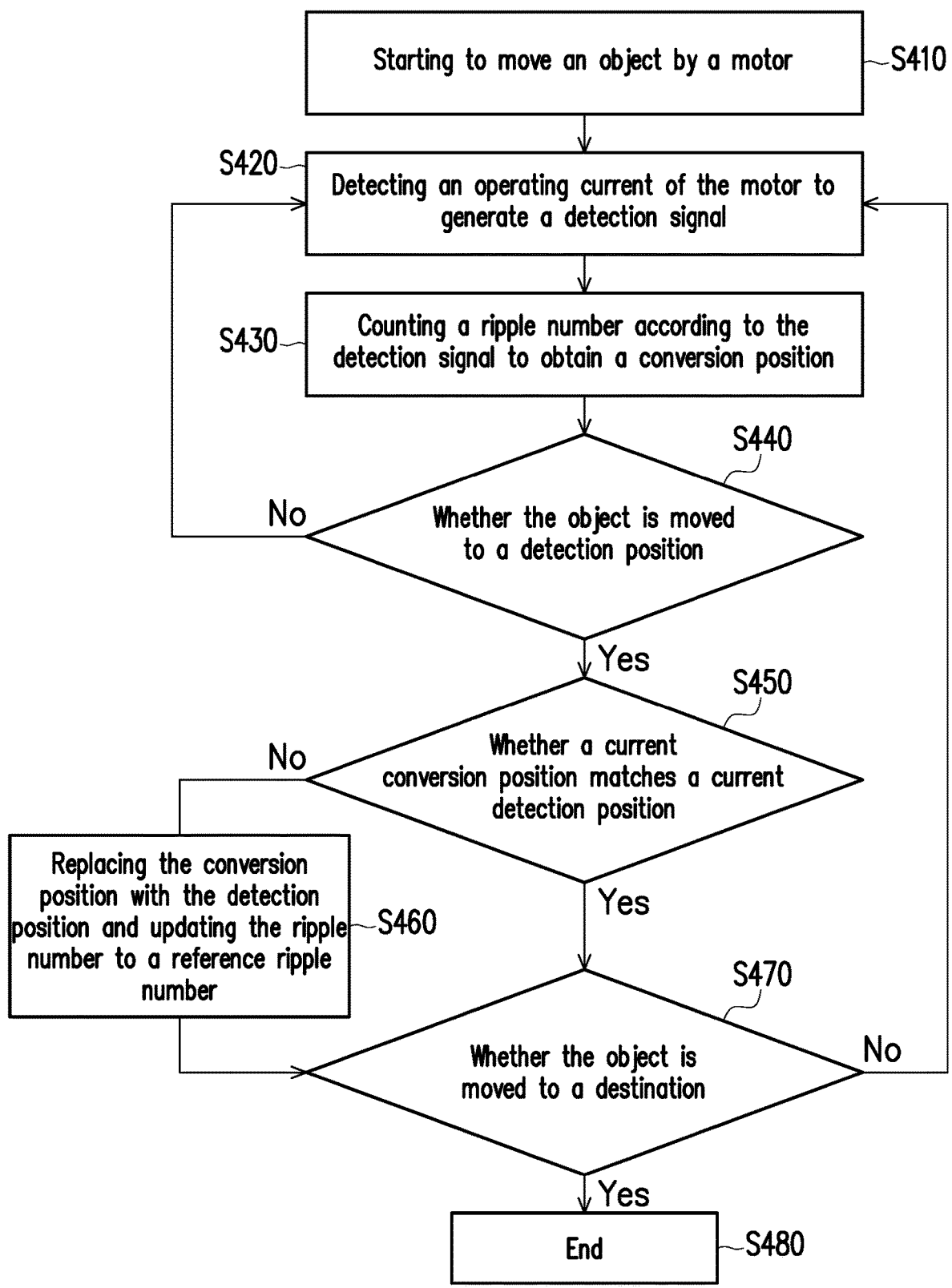
FIG. 8 is a flow chart of a motor control method according to an embodiment of the invention.
Figure 9:
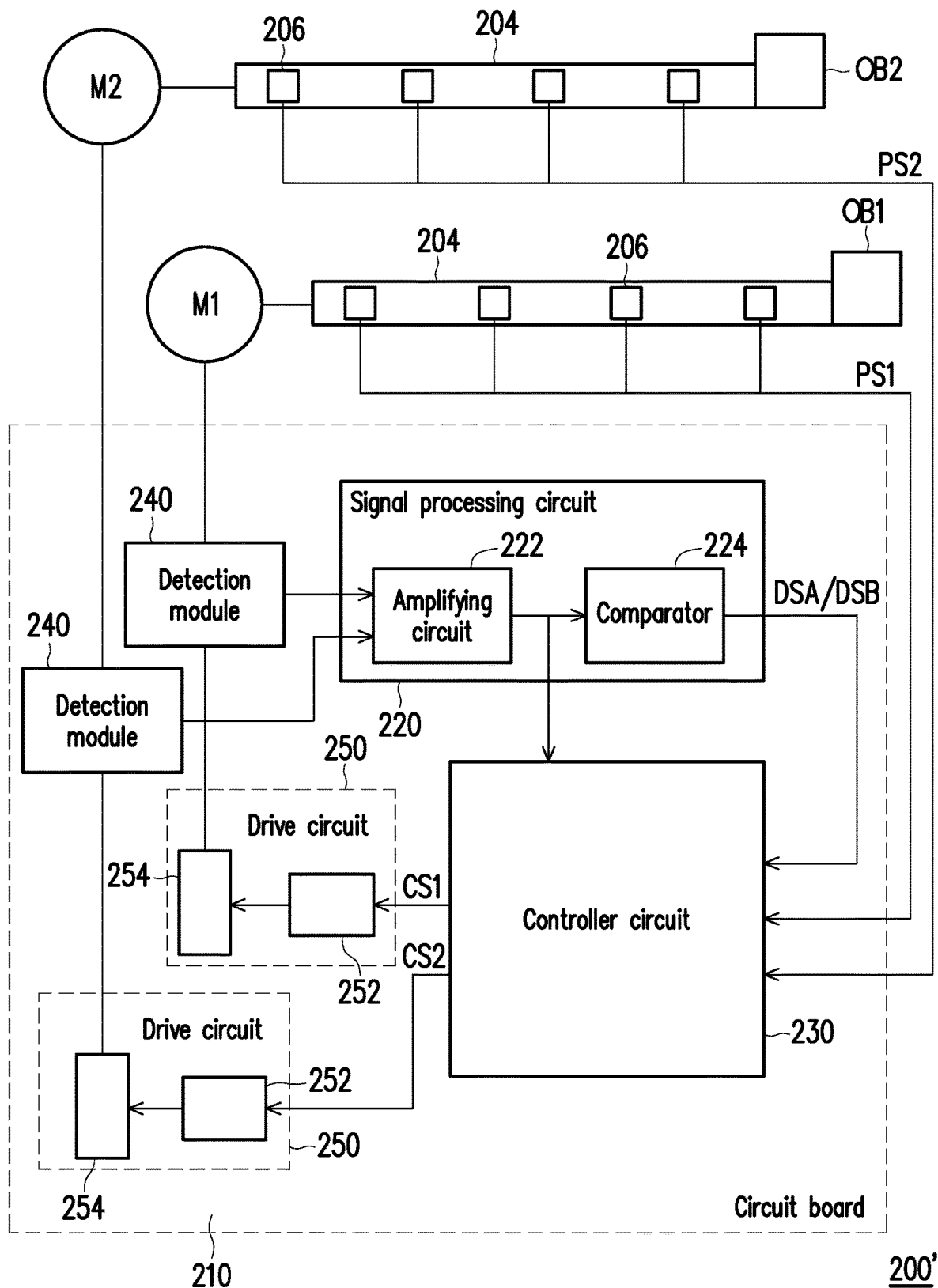
FIG. 9 is a schematic block diagram of a motor control apparatus according to another embodiment of the invention.

FIG. 8 is a flow chart of a motor control method according to an embodiment of the invention. Referring to FIG. 8, the motor control method in FIG. 8 may be applied to the foregoing embodiments. Steps of the motor control method are described with reference to the element symbols in FIG. 6 and FIG. 7. In an embodiment, the motor control method in FIG. 8 may be stored in the logical circuit module 234 in a form of a program code that is loaded and executed by processor 232 to implement a position compensation function.

In step S410, the motor control apparatus 200 controls the motor M to start moving the object OB. In step S420, the detection module 240 detects an operating current of the motor M, and the signal processing circuit 220 generates a corresponding detection signal DS. In step S430, the controller circuit 230 counts a ripple number based on the detection signal DS to obtain a conversion position. In particular, after the processor 232 obtains a ripple number of a present operating current, a corresponding distance by which the object OB should be moved (which is referred to as a conversion distance herein) may be searched for from a lookup table as position information of the object OB.

In the process, the object OB is still moved on the moving track P. The controller circuit 230 monitors the position information of the object OB in real time according to an operating state (especially the operating current) of the motor M, and determines, according to the positioning signal PS, whether the object OB passes through one of the detection position P1-P4. In step S440, if the controller circuit 230 determines that the object OB does not move to any of the detection positions P1-P4, the process returns to step S420, and the detection module 240 continues to detect the operating current of the motor M. If the controller circuit 230 determines that the object OB is moved to one of the detection positions P1-P4, step S450 is performed.

In step S450, the processor 232 determines whether a current conversion position matches a current detection position. If yes, it indicates that the motor control apparatus 200 knows a precise position of the object OB, and the process proceeds to step S470. Otherwise, it indicates that a ripple number currently obtained by the controller circuit 230 has an error, and step S460 is performed for position compensation. In step S460, the processor 232 replaces the conversion position with the detection position, and updates the ripple number to a reference ripple number corresponding to the current detection position.

In step S470, the controller circuit 230 determines whether the object OB is moved to the destination. If yes, step S480 is executed, and the controller circuit 230 ends the movement action. Otherwise, the process returns to step S420, and the detection module 240 continues to detect the operating current of motor M.

For example, if a horizontal coordinate is defined along a direction of the movement track P (the values are arranged as P1, P2, P3, and P4 sequentially in ascending order relative to a start point), when the object OB is moved to the detection position P3, the controller circuit 230 first obtains a current ripple number (for example, 140) based on the detection signal DS, and obtains a conversion position (for example, 140 mm) of the object OB according to the ripple number. In addition, the controller circuit 230 may also obtain coordinates (for example, 150 mm) or a distance of the detection position P3 and a corresponding reference ripple number (for example, 150) from the logical circuit module 234 according to the positioning signal PS. Next, the controller circuit 230 compares the detection position P3 to the conversion position. When the detection position P3 does not match the conversion position, the controller circuit 230 updates the position information of the object OB. In particular, the controller circuit 230 updates the current ripple number to the reference ripple number (for example, 140 is replaced with 150), and replaces the conversion position with the detection position P3 (for example, 140 mm is replaced with 150 mm). Therefore, the controller circuit 230 may determine the position information of the detection positions P1-P4 according to the positioning signal PS, and determine whether the ripple number obtained from the detection signal DS can correctly reflect an actual position of the object OB, thereby precisely positioning the object OB. The value or the distance/position used in this embodiment is merely for reference but is not intended to limit the scope of the invention.

In addition, the motor control apparatus 200 may further have a protection function. For example, when the motor control apparatus 200 is applied to a vehicle, the motor control apparatus 200 can provide an anti-pinch function or avoid current overload of the motor M. The processor 232 may execute at least one program code to implement the protection function.

The logical circuit module 234 may further pre-store a lookup table and an operating threshold. The lookup table records a first reference coefficient X and a second reference coefficient Y corresponding to various motor models. $X+Y=1$, and the first reference coefficient X is less than the second reference coefficient Y. In each movement cycle, the processor 232 determines, based on the operating threshold, whether a current operating state of the motor M meets a normal operating standard. Each back and forth movement of the object OB on the movement path P may be considered as a movement cycle. For example, if the object OB is a power window of an automobile, each opening and closing of the power window may be considered as a movement cycle.

In this embodiment, the controller circuit 230 detects the operating current to confirm an operating state of the motor M. The controller circuit 230 receives an original detection signal DS1 from the amplifying circuit 222. When a current value of the original detection signal DS1 is equal to or greater than the operating threshold (a current threshold), the processor 232 determines that the motor M does not meet the normal operating standard. Accordingly, the processor 232 may stop driving or decelerate the motor M to avoid current overload or may enable the anti-pinch function. For example, referring to FIG. 3, when a pulse period t of the curve 122 is greater than or equal to an operating threshold (a time threshold), the processor 232 determines that the motor M does not meet the normal operating standard, and therefore stops driving or decelerates the motor M to avoid current overload or correspondingly enable the anti-pinch function.

In addition, the controller circuit 230 may further execute an adaptive learning algorithm according to the operating current of the motor M. Since the motor M is affected by factors such as aging, a temperature, supply voltage fluctuation, or vibration, a constant operating threshold cannot truly reflect the operating state of the motor M. In this embodiment, the controller circuit 230 may directly receive the original detection signal DS1, so that the controller circuit 230 can monitor the state of the motor M in real time and correspondingly adjust the operating threshold, which may be understood as the adaptive learning algorithm executed by the controller circuit 230. Preferably, the processor 232 may update the operating threshold in each movement cycle, which is not intended to limit the scope of the invention.

During adaptive learning, the processor 232 obtains the first reference coefficient X and the second reference coefficient Y corresponding to the motor M from the lookup table, and calculates a new operating threshold An in each movement cycle. The new operating threshold An meets $An=X*Bc+Y*Ap$. Bc is a detection value of a current operating state of the motor M (for example, a value of the operating current or the pulse period t), and Ap is an operating threshold in a previous movement cycle. The processor 232 uses the new operating threshold An as an updated operating threshold to replace a factory-default operating threshold or the previous operating threshold Ap.

For example, when the controller circuit 230 determines whether the value of the operating current of the motor M is excessively high, the operating threshold An or Ap is a current threshold. The controller circuit 230 may obtain the value of the present operating current of the motor M (as the foregoing detection value Bc) based on the original detection signal DS1, and calculate a new operating threshold An. In one movement cycle, the controller circuit 230 determines whether the value of the operating current of the motor M is greater than the operating threshold An to determine whether the motor M meets the normal operating standard.

In another embodiment, when the controller circuit 230 determines whether a pulse time of the operating current of the motor M is excessively long, the operating threshold An or Ap is a time threshold. The controller circuit 230 may obtain a current pulse period t of the motor M (as the detection value Bc) based on the original detection signal DS1 or the original detection signal DS, and calculate a new operating threshold An. In one movement cycle, the controller circuit 230 determines whether the pulse period t of the operating current of the motor M is greater than the operating threshold An to determine whether the motor M meets the normal operating standard.

FIG. 5 is a schematic block diagram of a motor control apparatus according to another embodiment of the invention. Referring to FIG. 5, a motor control apparatus 200' can control two or more motors. Only a first motor M1 and a second motor M2 are shown here, but the invention is not limited thereto. The controller circuit 230 may control, according to a first detection signal DSA, the first motor M1 to move a first object OB1, and control, according to a second detection signal DSB, the second motor M2 to move a second object OB2. The first detection signal DSA is generated according to an operating state of the first motor M1, and the second detection signal DSB is generated according to an operating state of the second motor M2. The controller circuit 230 may receive the first detection signal DSA and the second detection signal DSB simultaneously or separately, to generate first position information corresponding to the first object OB1 and second position information corresponding to the second object OB2, and output control signals CS1 and CS2 respectively corresponding to the first motor M1 and the second motor M2. In other words, the controller circuit 230 of the motor control apparatus 200' can control a plurality of motors simultaneously or separately. The first detection signal DSA, the second detection signal DSB, and the corresponding first position information and second position information are generated in a manner similar to that in which the detection signal DS and the position information in the embodiments of FIG. 6 to FIG. 8 are generated. Those skilled in the art can obtain sufficient suggestions or instructions from the foregoing descriptions, and therefore details are not described again.

It should be additionally noted that the controller circuit 230 may control the first motor M1 and the second motor M2 to sequentially move the first object OB1 and the second object OB2, or may move the first object OB1 and the second object OB2 simultaneously, which is not limited in the invention.

In an embodiment, the first object OB1 is a sunshade, and the second object OB2 is a sunroof of an automobile. If the controller circuit 230 is to open the sunshade and the sunroof of the automobile, the controller circuit 230 determines, according to the first detection signal DSA, whether opening of the sunshade completes, and after opening of the sunshade ends, the controller circuit 230 controls the second motor M2 to completely open the sunroof of the automobile. Before the operation as opening of the sunshade completes, the controller circuit 230 outputs a control signal CS1 to open the sunshade, and receives a positioning signal PS1 to determine a degree how much the sunshade is opened. The sunroof starts to move until the sunshade opens to a specific position. The controller circuit 230 outputs a control signal CS2 to open the sunroof of the automobile, and determines, according to the second detection signal DSB and a positioning signal PS2, whether the operation as opening of the sunroof of the automobile completes. The controller circuit 230 outputs a control signal CS2 to close the sunroof of the automobile. The controller circuit 230 outputs a control signal CS1 to close the sunshade of the sunroof of the automobile until the car sunroof completely closes. Certainly, the descriptions of the first object OB1 and the second object OB2 are merely conceptual understanding of the invention. Those skilled in the art can certainly adjust, according to an actual requirement, corresponding manners of operating the first object OB1 and the second object OB2, which is not intended to limit the scope of the invention.

Details about implementations in which the controller circuit 230 controls the first motor M1 and the second motor M2 are also similar to the process in which the controller circuit 230 controls the motor M in the foregoing embodiment, and therefore are not described again.

It should be particularly noted that, in this embodiment, the motor control apparatus 200' controls a plurality of motors through one controller circuit 230. Therefore, with the motor control apparatus 200', a number of relevant elements used can be reduced, and a related structure can be simplified to achieve low production costs.

In view of the foregoing, the invention provides a motor control apparatus for controlling at least one motor. The motor control apparatus may be electrically connected to one or more motors to control each motor, and detection signals among the plurality of motors do not interfere with each other. In the invention, a multi-motor control technology may be implemented with a single motor control apparatus, and therefore, production costs are lowered. In addition, in the invention, calculated position information may be further corrected using a positioning detector, so that a ripple counting error caused by external interference can be eliminated, thereby improving positioning precision. The controller circuit of the invention may further adjust, in real time, an operating threshold value corresponding to the operating state of the motor in each movement cycle, so that a flexible protection function is provided.

Finally, it should be noted that the foregoing embodiments are merely used for describing the technical solutions of the invention, but are not intended to limit the invention. Although the invention is described in detail with reference to the foregoing embodiments, a person of ordinary skill in the art should understand that, modifications may still be made to the technical solutions in the foregoing embodiments, or equivalent replacements may be made to part or all of the technical features; and these modifications or replacements will not cause the essence of corresponding technical solutions to depart from the scope of the technical solutions in the embodiments of the invention.

What is claimed is:

1. A noise filtering method for a motor, the motor rotating according to an operating voltage, wherein the noise filtering method comprises:
    setting an inspection period and a minimum threshold;
    generating a pulse signal according to the operating voltage;
    determining whether a time corresponding to each sub-pulse signal in the pulse signal meets the inspection period; and
    determining whether a pulse width corresponding to each sub-pulse signal is equal to or greater than the minimum threshold,
    wherein the step of determining whether the time corresponding to each sub-pulse signal in the pulse signal meets the inspection period comprises:
    calculating a time interval between a rising edge time point corresponding to the sub-pulse signal and another rising edge time point corresponding to a previous valid sub-pulse signal; and determining that the sub-pulse signal meets the inspection period when the time interval is equal to or greater than the inspection period.

2. The noise filtering method according to claim 1, wherein the inspection period and the minimum threshold are set according to a rotation period of the motor, and the rotation period corresponds to a maximum rotation speed of the motor.

3. The noise filtering method according to claim 2, wherein the inspection period is set in a range of 60% to 80% of the rotation period of the motor.

4. The noise filtering method according to claim 2, wherein the minimum threshold is set in a range of 5% to 10% of the rotation period of the motor.

5. The noise filtering method according to claim 1, wherein the step of determining whether the pulse width corresponding to each sub-pulse signal is equal to or greater than the minimum threshold comprises:
- determining whether the pulse width corresponding to the sub-pulse signal is equal to or greater than the minimum threshold when the sub-pulse signal meets the inspection period; and
- determining that the pulse width is a valid pulse width when the pulse width corresponding to the sub-pulse signal is equal to or greater than the minimum threshold and correspondingly accumulating a pulse count,
- wherein the pulse count corresponds to a rotation state of the motor.

6. The noise filtering method according to claim 1, wherein the pulse signal comprises a rising edge and a falling edge, the rising edge is determined by using an interrupt algorithm or a general-purpose input/output (GPIO) poll algorithm, and the falling edge is determined by using the interrupt algorithm or the GPIO poll algorithm.

7. A recording medium recording at least one program code, wherein the at least one program code is loaded by a motor control circuit to perform a noise filtering method for a motor, the motor rotating according to an operating voltage, wherein the noise filtering method comprises:
- setting an inspection period and a minimum threshold;
- generating a pulse signal according to the operating voltage;
- determining whether a time corresponding to each sub-pulse signal in the pulse signal meets the inspection period; and
- determining whether a pulse width corresponding to each sub-pulse signal is equal to or greater than the minimum threshold,
- wherein the step of determining whether the time corresponding to each sub-pulse signal in the pulse signal meets the inspection period comprises:
- calculating a time interval between a rising edge time point corresponding to the sub-pulse signal and another rising edge time point corresponding to a previous valid sub-pulse signal; and
- determining that the sub-pulse signal meets the inspection period when the time interval is equal to or greater than the inspection period.

8. The recording medium according to claim 7, wherein the inspection period and the minimum threshold are set according to a rotation period of the motor, and the rotation period corresponds to a maximum rotation speed of the motor.

9. The recording medium according to claim 8, wherein the inspection period is set to be in a range of 60% to 80% of the rotation period of the motor.

10. The recording medium according to claim 8, wherein the minimum threshold is set to be in a range of 5% to 10% of the rotation period of the motor.

11. The recording medium according to claim 7, wherein the step of determining whether the pulse width corresponding to each sub-pulse signal is equal to or greater than the minimum threshold comprises:
- determining whether the pulse width corresponding to the sub-pulse signal is equal to or greater than the minimum threshold when the sub-pulse signal meets the inspection period; and
- determining that the pulse width is a valid pulse width when the pulse width corresponding to the sub-pulse signal is equal to or greater than the minimum threshold and correspondingly accumulating a pulse count,
- wherein the pulse count corresponds to a rotation state of the motor.

12. The recording medium according to claim 7, wherein the pulse signal comprises a rising edge and a falling edge, the rising edge is determined by using an interrupt algorithm or a general-purpose input/output (GPIO) poll algorithm, and the falling edge is determined by using the interrupt algorithm or the GPIO poll algorithm.

13. A motor control circuit for a motor, wherein the motor control circuit comprises:
- a circuit board;
- a detection module, disposed on the circuit board and electrically coupling to at least one motor, and detecting an operating current of the at least one motor;
- a signal processing circuit, disposed on the circuit board and electrically coupling to the detection module, and generating at least one detection signal according to the operating current of the at least one motor;
- a controller circuit, disposed on the circuit board and electrically coupling to the signal processing circuit, and counting a number of ripples of the operating current according to the detection signal to obtain position information of at least one object after being moved by the at least one motor; and
- a drive circuit, disposed on the circuit board and electrically coupling to the at least one motor and the controller circuit, and supplying an operating current to the at least one motor according to at least one control signal from the controller circuit.

14. The motor control circuit according to claim 13, wherein the drive circuit drives the motor to rotate, the detection module and the signal processing circuit sense an operating voltage and transmit a result to the controller circuit, and the controller circuit outputs a control command to the drive circuit.

15. The motor control circuit according to claim 13, further comprising:
- at least one positioning detector, electrically coupling to the controller circuit, and detecting whether the at least one object passes through the at least one detection position on a movement path and correspondingly generating a positioning signal,
- wherein the controller circuit obtains a reference position information corresponding to the at least one detection position according to the positioning signal.

* * * * *